United States Patent
Ikeda et al.

(10) Patent No.: US 8,120,218 B2
(45) Date of Patent: Feb. 21, 2012

(54) STATOR, MOTOR, AND METHOD OF MANUFACTURING STATOR

(75) Inventors: Shinji Ikeda, Kosai (JP); Masayasu Iwasaki, Hamamatsu (JP)

(73) Assignee: Asmo Co., Ltd. (JP)

( * ) Notice: Subject to any disclaimer, the term of this patent is extended or adjusted under 35 U.S.C. 154(b) by 438 days.

(21) Appl. No.: 12/419,566

(22) Filed: Apr. 7, 2009

(65) Prior Publication Data

US 2009/0256438 A1 Oct. 15, 2009

(30) Foreign Application Priority Data

Apr. 15, 2008 (JP) ................... 2008-105820

(51) Int. Cl.
*H02K 3/28* (2006.01)

(52) U.S. Cl. .......................................... 310/71; 310/179

(58) Field of Classification Search .................. 310/179, 310/71
See application file for complete search history.

(56) References Cited

U.S. PATENT DOCUMENTS

| | | | |
|---|---|---|---|
| 6,664,677 B2 * | 12/2003 | Tanaka et al. ................... | 310/71 |
| 7,402,925 B2 * | 7/2008 | Best et al. .................. | 310/68 C |
| 7,663,277 B2 * | 2/2010 | Kinoshita et al. ............... | 310/71 |
| 7,952,245 B2 * | 5/2011 | Ueda et al. ...................... | 310/71 |
| 2005/0088049 A1 * | 4/2005 | De Filippis et al. ........... | 310/71 |
| 2007/0007832 A1 * | 1/2007 | Ichikawa et al. ................ | 310/71 |
| 2007/0046125 A1 * | 3/2007 | Torii et al. ............... | 310/156.53 |

FOREIGN PATENT DOCUMENTS

| | | |
|---|---|---|
| JP | 2001-320848 A | 11/2001 |
| JP | 2003-284279 A | 10/2003 |
| JP | 2005-086985 A | 3/2005 |
| JP | 2006-136089 A | 5/2006 |
| JP | 2007-135339 A | 5/2007 |

\* cited by examiner

*Primary Examiner* — Quyen Leung
*Assistant Examiner* — Naishadh Desai
(74) *Attorney, Agent, or Firm* — Caesar, Rivise, Bernstein, Cohen & Pokotilow, Ltd.

(57) ABSTRACT

A stator core of a stator has a plurality of teeth extending radially. A plurality of connector pins project from a partition plate. Wires each have a wire connection portion drawn out from the corresponding one of coils. Each wire is electrically connected to the corresponding connector pins by winding the wire connection portions around the connector pins.

11 Claims, 6 Drawing Sheets

STATOR, MOTOR, AND METHOD OF MANUFACTURING STATOR

BACKGROUND OF THE INVENTION

The present invention relates to a stator, a motor, and a method of manufacturing a stator.

In a brushless motor described in Japanese Laid-Open Patent Publication No. 2006-136089, wire connection portions drawn out from coils are each inserted into a U-shaped bent portion of a conductive member provided in a stator, thus electrically connecting the wire connection portions to the corresponding U-shaped bent portions.

However, since the opening width of each U-shaped bent portion is substantially equal to the width of each wire, which is small, high operating accuracy is required to insert the wires directly into the U-shaped bent portions. It is particularly difficult to insert multiple aligned wires into a single U-shaped bent portion. Wire insertion is further difficult if, for example, the diameter of each wire is great and the wire is highly rigid as in the case of a brushless motor used in a power steering apparatus of a vehicle.

SUMMARY OF THE INVENTION

Accordingly, it is an objective of the present invention to provide a stator, a motor, and a method of manufacturing a stator that allow wire connection portions drawn out from coils to be easily connected.

In accordance with one aspect of the present invention, the stator having the following components is provided. A stator core has a plurality of teeth extending radially. The stator core defines an axial direction and a radial direction. Each of a plurality of coils is formed by winding a corresponding one of a plurality of wires around the corresponding one of the teeth. A plurality of connector pins project from a partition plate. Each of the wires has a wire connection portion drawn out from the corresponding one of the coils. The wire connection portion of each wire is wound about the corresponding connector pins, such that the wire is electrically connected to the connector pins.

Further, in accordance with another aspect of the present invention, a method of manufacturing a stator is provided. The method includes: preparing a stator core, the stator core including a plurality of teeth extending radially and a plurality of coils each formed by winding a wire around one of the teeth; attaching a partition plate to the stator core, a plurality of connector pins projecting from the partition plate; and electrically connecting each wire to the corresponding connector pins by winding the wire connection portions drawn out from the coils around the connector pins.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENTS

FIGS. 1A to 6B show a brushless motor 1 according to one embodiment of the present invention.

Figure 1A:
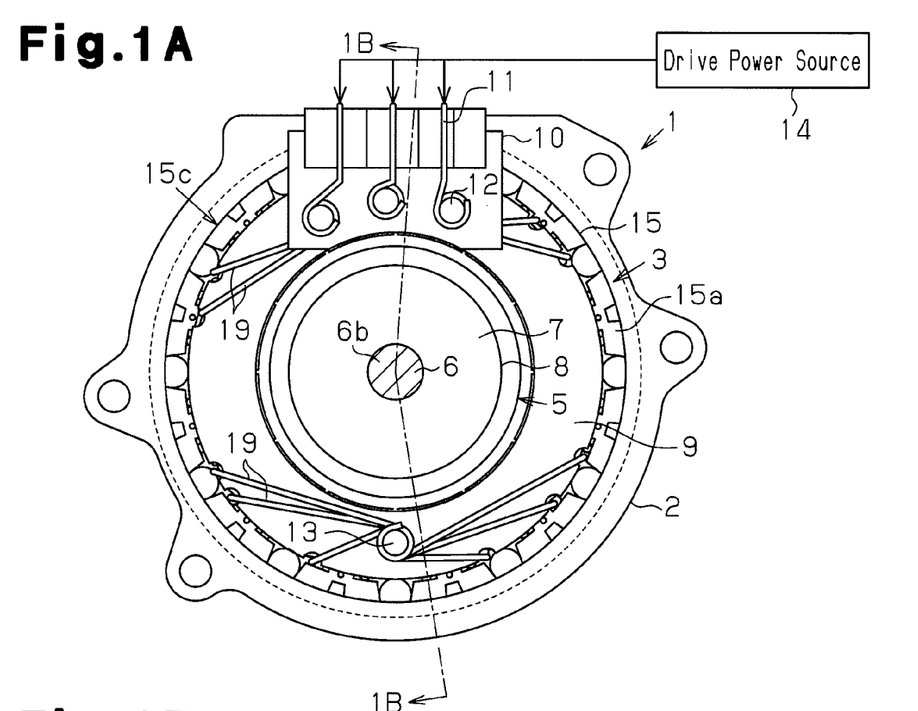
FIG. 1A is a plan view showing a brushless motor according to the present invention.
Figure 1B:
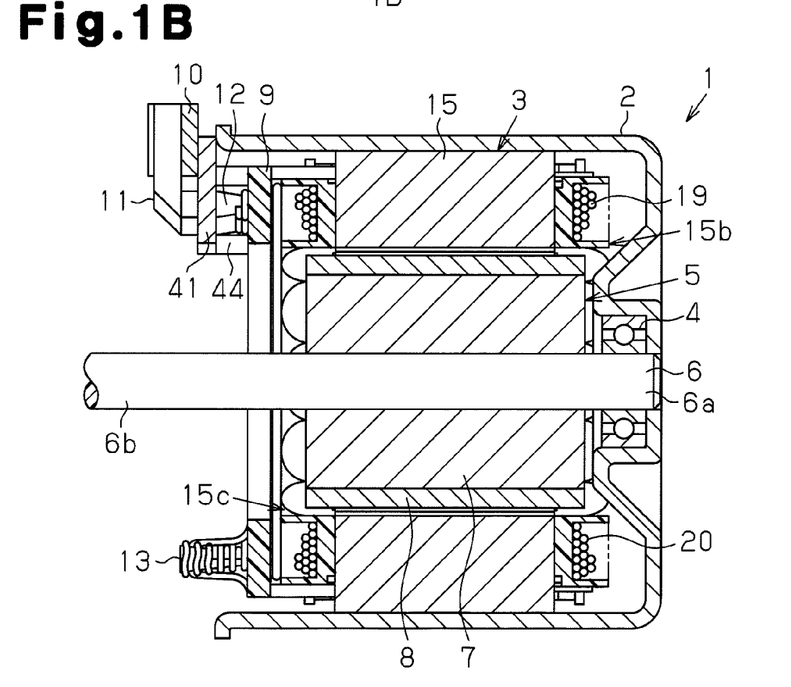
FIG. 1B is a cross-sectional view taken along line 1B-1B of FIG. 1A.

The brushless motor 1, which is shown in FIGS. 1A and 1B, is used as a drive source of a power steering apparatus (not shown) of a vehicle. The brushless motor 1 assists in operation of a steering shaft connected to a steering wheel of the vehicle.

The brushless motor 1 is an inner rotor type and has a cylindrical housing 2 with a bottom, a stator 3, and a rotor 5. The stator 3, which has a substantially cylindrical shape, is fixed to the inner circumferential surface of the housing 2. A bearing 4 is arranged at the center of the bottom of the housing 2.

The rotor 5 is arranged inward from the stator 3 in a manner rotatable through the bearing 4. A first end 6a of a rotary shaft 6 of the rotor 5 is supported by the bearing 4. A second end 6b of the rotary shaft 6 projects from the housing 2 and is connected to the steering shaft (not shown) of the vehicle. A cylindrical rotor core 7 is fixed to the rotary shaft 6. A plurality of magnets 8, which are magnetized in such a manner that different polarities, or north poles and south poles, are alternately arranged at predetermined angles, are secured to the outer circumferential surface of the rotor core 7.

Figure 2A:
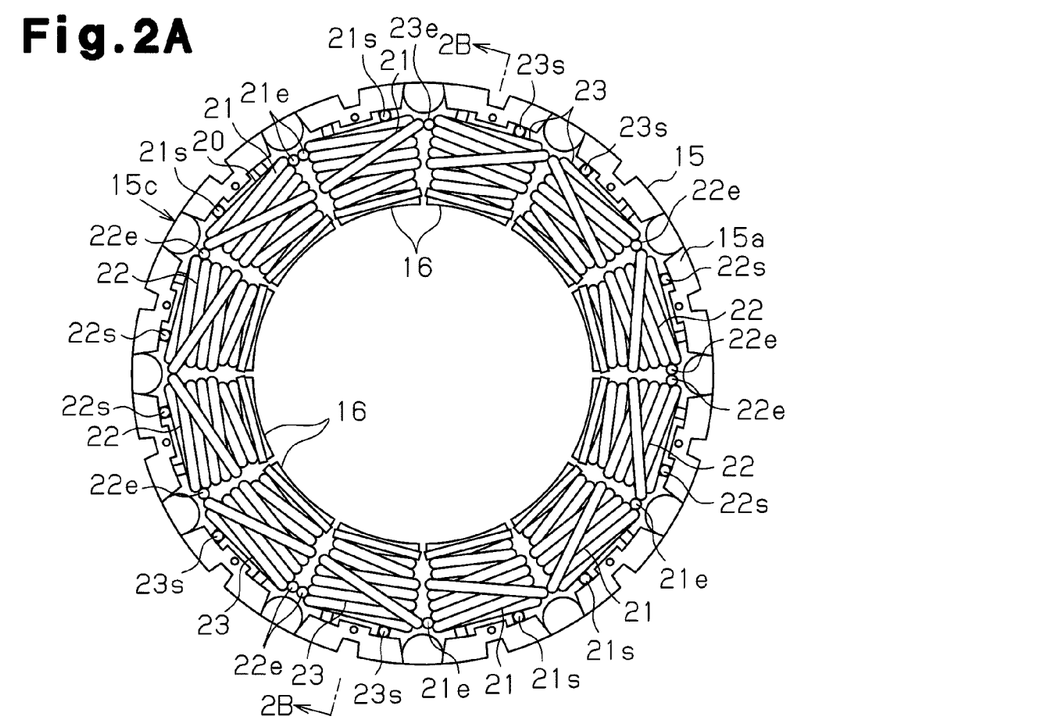
FIG. 2A is a plan view showing a stator illustrated in FIG. 1A, as viewed from the side corresponding to a partition plate.

As shown in FIG. 2A, a stator core 15 of the stator 3 has a plurality of, for example, twelve teeth 16, which extend radially inward. Specifically, the teeth 16 are spaced apart at predetermined angles, or 30°. Radially outer ends of the teeth 16 are coupled together through corresponding coupling members, thus forming an outer stator ring 15a.

A pair of insulators 18 are attached to the stator core 15 from both axial sides. The insulators 18 each function as a bobbin covering the axial end surfaces and the radially outer surfaces of the teeth 16. Each of wires 19 is wound about each tooth 16 by way of concentrated winding with the insulator 18 in between to form a coil 20. Each wire 19 is a metal line formed of, for example, copper, and is covered by a covering member formed of insulating resin material.

In the present embodiments, the wires 19 include three types of wires, which are U-phase wires 19u, V-phase wires 19v, and W-phase wires 19w. The coils 20 include three types of coils, which are U-phase coils 21, V-phase coils 22, and W-phase coils 23. The U-phase wires 19u form the U-phase coils 21, the V-phase wires 19v form the V-phase coils 22, and the W-phase wires 19w form the W-phase coils 23. A drive power source 14 supplies excitation currents of three phases, which are U, V, and W phases, to the coils 20.

The U-phase coils 21, the V-phase coils 22, and the W-phase coils 23 are each wound around the corresponding one of the teeth 16. Each one of the wires 19 is wound continuously while passing those of the coils corresponding to the other phases. In the present embodiment, the U-phase coils 21, the V-phase coils 22, and the W-phase coils 23 are arranged around corresponding adjacent pairs of the teeth 16. Specifically, there are two U-phase wires 19u, two V-phase wires 19v, and two W-phase wires 19w. Each of the wires 19 is wound around those of the teeth 16 that are opposed to each other by being spaced apart by 180°, while passing those of the teeth 16 corresponding to the other phases.

Figure 2B:
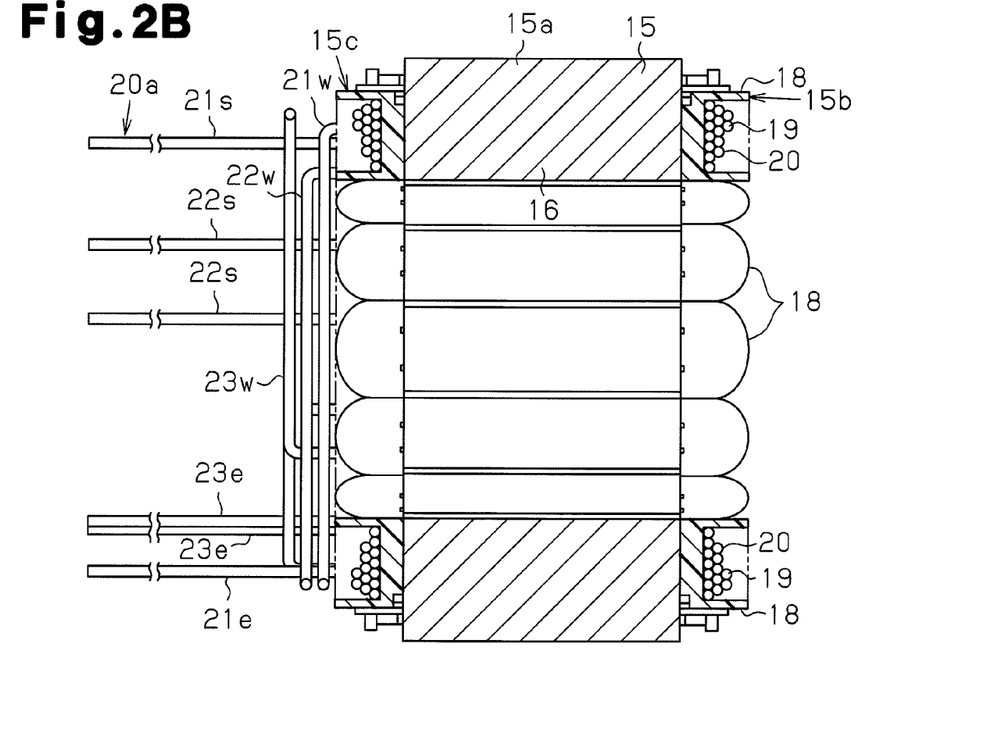
FIG. 2B is a cross-sectional view taken along line 2B-2B of FIG. 2A.

For example, a total of four U-phase coils 21 are provided, with two arranged in an upper portion of FIG. 2A and the other two provided in a lower portion of the drawing. Each one of the U-phase coils 21 is wound around the corresponding one of the teeth 16 from a winding start portion 21s to a winding end portion 21e. FIG. 2B illustrates two connecting wires 21w. Each one of the connecting wires 21w extends from one of the two U-phase coils 21 located in the upper portion of FIG. 2A to the corresponding one of the U-phase coils 21 arranged in the lower portion of the drawing.

A total of four V-phase coils 22 are provided, with two arranged in an upper left portion of FIG. 2A and two provided in a lower right portion of the drawing. Each one of the V-phase coils 22 is wound around the corresponding one of the teeth 16 from a winding start portion 22s to a winding end portion 22e. FIG. 2B illustrates two connecting wires 22w. Each one of the connecting wires 22w extends from one of the two V-phase coils 22 located in the left portion of FIG. 2A to the corresponding one of the V-phase coils 22 arranged in the right portion of the drawing.

A total of four W-phase coils 23 are provided, with two arranged in an upper right portion of FIG. 2A and two provided in a lower left portion of the drawing. Each one of the W-phase coils 23 is wound around the corresponding one of the teeth 16 from a winding start portion 23s to a winding end portion 23e. FIG. 2B illustrates two connecting wires 23w. Each one of the connecting wires 23w extends from one of the two W-phase coils 23 located in the upper right portion of FIG. 2A to the corresponding one of the W-phase coils 23 arranged in the lower left portion of the drawing.

As illustrated in FIG. 2B, the stator core 15 includes a first shaft end 15b facing the bottom of the housing 2 and a second shaft end 15c facing the opening of the housing 2. The connecting wires 21w, 22w, and 23w are all drawn out to the second shaft end 15c. A total of six winding start portions 21s to 23s that are not connected to the connecting wires 21w, 22w, 23w and a total of six winding end portions 21e to 23e are all drawn out to the second shaft end 15c. These winding start portions 21s to 23s and the winding end portions 21e to 23e function as a total of twelve wire connection portions 20a each drawn out from the corresponding ones of the coils 20.

If the covering member is removed from each wire connection portion 20a, the metal wire inside is exposed.

With reference to FIG. 1B, a partition plate 9 is fixed to the second shaft end 15c of the stator core 15. That is, the partition plate 9 covers the second shaft end 15c. The partition plate 9 is formed of insulating synthetic resin material.

Figure 3A:
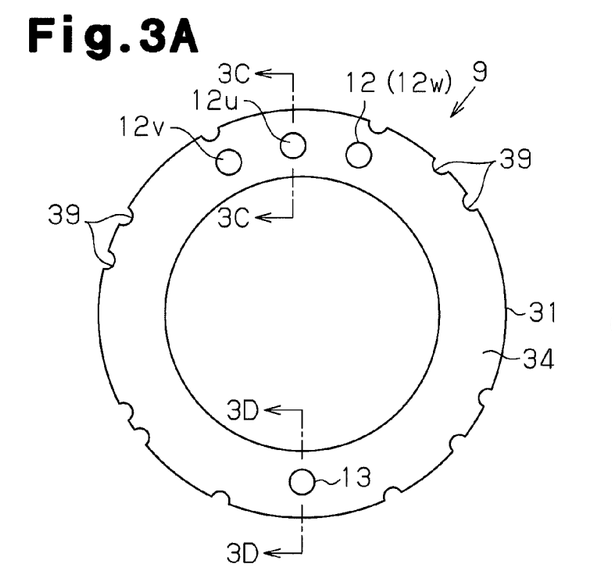
FIG. 3A is a plan view showing a partition plate illustrated in FIG. 1B.
Figure 3B:
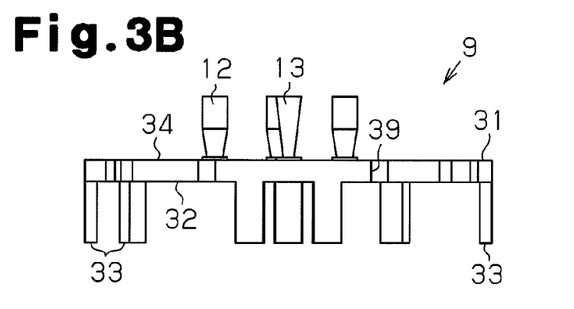
FIG. 3B is a side view showing the partition plate illustrated in FIG. 3A.

As illustrated in FIGS. 3A and 3B, the partition plate 9 has an annular plate body 31 and a plurality of engagement pieces 33 extending axially from the outer peripheral end of the plate body 31. The partition plate 9 is attached to the stator core 15 by axially inserting the engagement pieces 33 into engagement recesses (not shown) formed in the stator 3. As a result, the connecting wires 21w, 22w, 23w are received between the partition plate 9 and the stator core 15.

With reference to FIG. 3A, twelve guide cutouts 39 are formed in the outer circumferential surface of the partition plate 9. Each of the guide cutouts 39 faces outward in radial directions of the partition plate 9 and extends through the partition plate 9 in the direction of the thickness of the partition plate 9. Each one of the guide cutouts 39 receives one of the wire connection portions 20a. The wire connection portions 20a are thus passed through the partition plate 9 and exposed to the exterior of the partition plate 9 from the stator core 15. The radial dimension of each guide cutout 39 is substantially equal to the diameter of each wire connection portion 20a. The circumferential dimension of the guide cutout 39 is slightly greater than the diameter of the wire connection portion 20a. This restricts movement of each wire 19 in the circumferential direction and the radial direction of the partition plate 9 when the wire 19 is received in the corresponding guide cutout 39.

With reference to FIGS. 3A and 3B, the partition plate 9 has a plurality of feed pins 12 and a common pin 13. Specifically, three feed pins 12 are arranged in an upper portion of FIG. 3A and the common pin 13 is located in a lower portion of the drawing. The feed pins 12 and the common pin 13 each have a substantially columnar shape.

The wire connection portions 20a are each wound around the feed pins 12 and the common pin 13 of the partition plate 9, which are located to be opposed to the stator 3. As a result, the wire connection portions 20a are electrically connected to the feed pins 12 and the common pin 13.

The surface of the partition plate 9 facing the stator core 15 is referred to as a stator facing surface 32. The surface of the partition plate 9 opposed to the stator core 15 is referred to as an exposed plate surface 34. The feed pins 12 and the common pin 13 extend from the exposed plate surface 34 in the direction opposite to the stator core 15. The stator facing surface 32 may be referred to as an attachment surface and the exposed plate surface 34 may be referred to as a mounting surface.

Figure 5A:
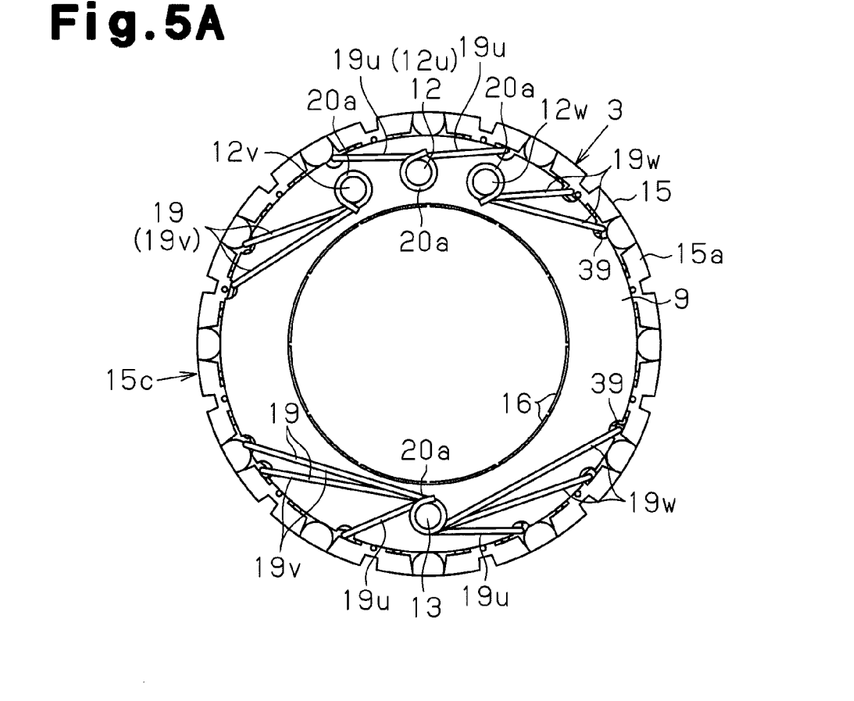
FIG. 5A is a plan view showing the stator illustrated in FIG. 2A having the partition plate illustrated in FIG. 3A.
Figure 5B:
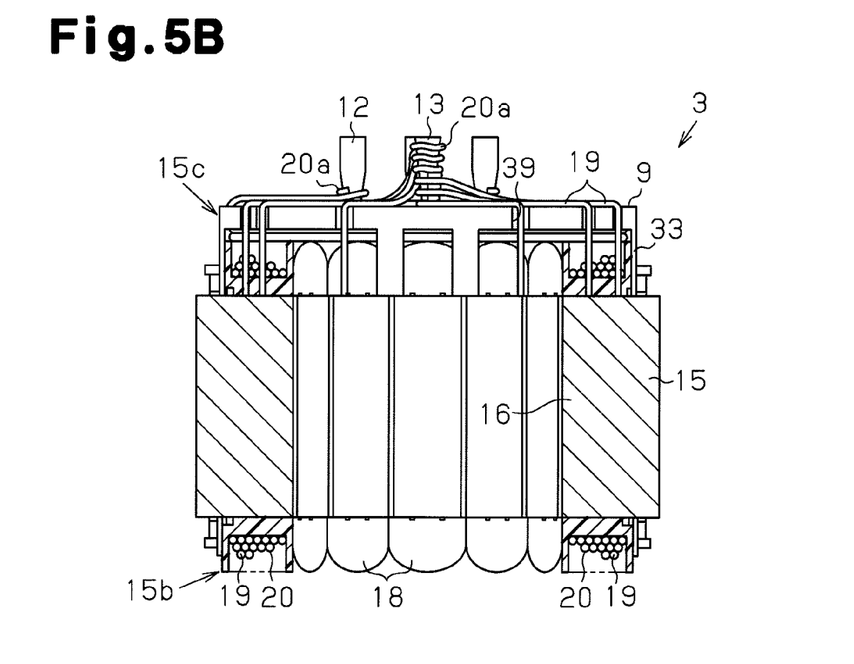
FIG. 5B is a cross-sectional side view showing a portion of FIG. 5A.

In the present embodiment, a total of three feed pins 12, which are a U-phase pin 12u, a V-phase pin 12v, and a W-phase pin 12w, are employed. For example, the pin at the center of FIG. 3A is the U-phase pin 12u, the pin on the left is the V-phase pin 12v, and the pin on the right is the W-phase pin 12w. As illustrated in FIG. 5A, the two U-phase wires 19u are electrically connected to the U-phase pin 12u. The two V-phase wires 19v are electrically connected to the V-phase pin 12v. The two W-phase wires 19w are electrically connected to the W-phase pin 12w.

As illustrated in FIGS. 1A and 1B, the feed pins 12 are each electrically connected to the drive power source 14 through the corresponding terminal 11. A terminal holder 10 attached to the housing 2 holds the terminals 11. The feed pins 12 and the common pin 13 each function as a connector pin. The feed pins 12 and the common pin 13 are formed of phosphor bronze. Each of the feed pins 12 receives an excitation current, or a drive electric current, of the corresponding one of the three phases, which are the U phase, the V phase, and the W phase, from the drive power source 14 through the corresponding one of the terminals 11.

Figure 3C:
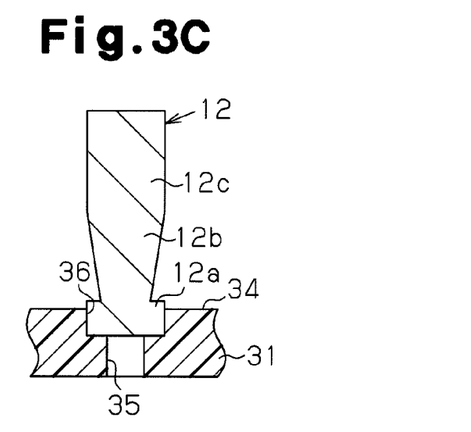
FIG. 3C is a cross-sectional view taken along line 3C-3C of FIG. 3A.
Figure 3D:
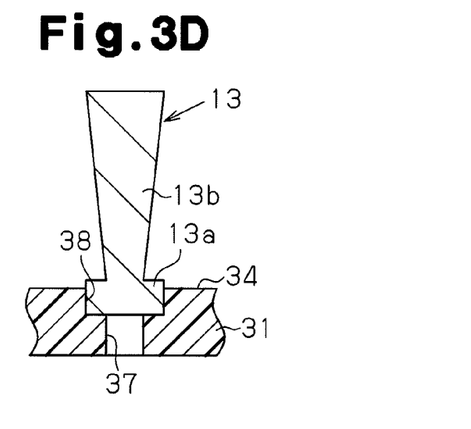
FIG. 3D is a cross-sectional view taken along line 3D-3D of FIG. 3A.

With reference to FIG. 3A, the partition plate 9 has three first through holes 35, which extend through the partition plate 9 in the direction of the width of the partition plate 9, and a second through hole 37. As illustrated in FIG. 3C, a large diameter portion is provided in a portion of each of the first through holes 35 facing the exposed plate surface 34. The large diameter portion configures a first engagement recess 36. With reference to FIG. 3D, the second through hole 37 forms a second engagement recess 38 facing the exposed plate surface 34.

As illustrated in FIG. 3C, each feed pin 12 has a base portion 12a, a tapered portion 12b, and a uniform diameter portion 12c. The base portion 12a, which is shaped like a flange, is engaged with the first engagement recess 36, thus fixing the feed pins 12 to the partition plate 9. The diameter of the tapered portion 12b becomes smaller toward the base portion 12a. The uniform diameter portion 12c has a uniform diameter.

As illustrated in FIG. 3D, the common pin 13 has a base portion 13a and a tapered portion 13b. The base portion 13a, which is shaped like a flange, is engaged with the second engagement recess 38, thus fixing the common pin 13 to the partition plate 9. The diameter of the tapered portion 13b becomes smaller toward the base portion 13a. The wire connection portions 20a are wound around the corresponding tapered portions 12b, 13b.

Figure 4A:
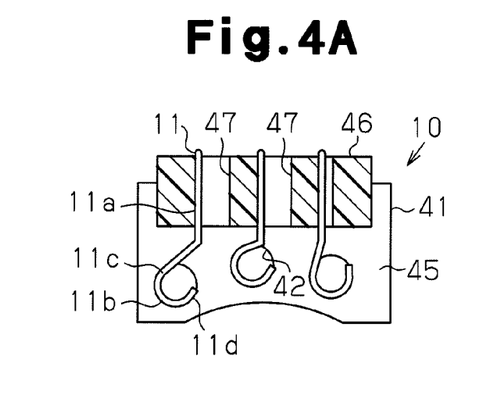
FIG. 4A is a plan view showing a terminal holder illustrated in FIG. 1A.
Figure 4B:
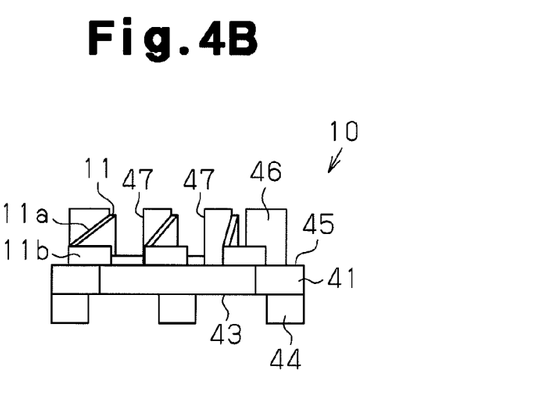
FIG. 4B is a side view showing a terminal holder illustrated in FIG. 4A.

As illustrated in FIGS. 1B and 4B, a plate-like holder body 41 of the terminal holder 10 is fixed to the partition plate 9 through a plurality of support pillars 44. With reference to FIGS. 4A and 4B, the holder body 41 has a facing surface 43 facing the partition plate 9 and an exposed holder surface 45 opposed to the facing surface 43. A total of three terminals 11 are arranged on the exposed holder surface 45.

The holder body 41 has a total of three insertion holes 42. The diameter of each of the insertion holes 42 is slightly greater than the diameter of the uniform diameter portion 12c. Each insertion hole 42 receives the corresponding feed pin 12. A holding portion 46 that holds the terminals 11 is arranged on the exposed holder surface 45. The holding portion 46 has a total of three accommodation holes 47 each receiving the corresponding terminal 11.

Each terminal 11 is formed by bending a metal plate at a plurality of points. The terminal 11 thus has a belt-like terminal body 11a and a bent terminal portion 11b, which is formed by bending an end of the terminal body 11a. Each one of the terminal bodies 11a is received and maintained in the corresponding one of the accommodation holes 47. Each feed pin 12 is inserted into and engaged with the corresponding bent terminal portion 11b. As illustrated in FIG. 4A, the interval between a proximal end 11c and a distal end 11d of each bent terminal portion 11b, which are opposed each other, is slightly smaller than the diameter of each uniform diameter portion 12c. The bent terminal portions 11b are arranged at the positions corresponding to the insertion holes 42. The terminal bodies 11a are electrically connected to a connector portion (not shown), which receives power from the drive power source 14.

When the feed pins 12 are inserted into the corresponding insertion holes 42, the feed pins 12 are received by the corresponding bent terminal portions 11b in a press-fitted manner and thus electrically connected to the bent terminal portions 11b. As a result, the drive power source 14 supplies excitation currents to the U-phase coils 21, the V-phase coils 22, and the W-phase coils 23 through the corresponding terminals 11.

In other words, in the brushless motor 1, the drive power source 14 supplies the excitation currents of the U phase, the V phase, and the W phase, each of which has a phase difference of 120° from the other phases, to the U-phase coils 21, the V-phase coils 22, and the W-phase coils 23 through the corresponding terminals 11 and the associated feed pins 12. This excites the U-phase coils 21, the V-phase coils 22, and the W-phase coils 23, thus generating a rotating magnetic field in the stator 3. The rotor 5 is thus rotated by the rotating magnetic field.

In the present embodiment, the U-phase wires 19u, the V-phase wires 19v, and the W-phase wires 19w are connected to form a Y-connection, or star-connection. The two U-phase wires 19u, the two V-phase wires 19v, and the two W-phase wires 19w are all wound around the common pin 13.

After being wound around the corresponding feed pins 12 and the common pin 13, the wire connection portions 20a are fixed to the feed pins 12 and the common pin 13 through welding such as TIG welding (tungsten inert gas welding).

The winding angle of each wire connection portion 20a with respect to the corresponding feed pin 12 or the common pin 13 is substantially 360°. In other words, each wire connection portion 20a is wound around the feed pin 12 or the common pin 13 by substantially one turn.

As illustrated in FIG. 5A, a wire distal end projecting from each feed pin 12 is arranged in such a manner as to face in a direction different from the direction of the line connecting the feed pin 12 and an adjacent one of the feed pins 12. Specifically, with reference to FIG. 5A, the wire distal ends extending from the V-phase pin 12v, which is located on the left, and the wire distal ends extending from the right W-phase pin 12w, which is located on the right, face in radially inward directions of the stator core 15. In contrast, the wire distal ends extending from the U-phase pin 12u, which is arranged at the center, face in a radially outward direction. That is, the distal ends of the wire connection portions 20a wound around the feed pin 12 on the left and the distal ends of the wire connection portions 20a wound around the feed pin 12 on the right face in the radially inward directions. Accordingly, the wire distal ends extend offset from the direction in which the feed pins 12 are aligned, or from the circumferential direction of the partition plate 9.

A method of manufacturing the stator 3 will hereafter be explained.

First, in a step of preparing a stator core, the stator core 15 in which the coils 20 are provided is prepared.

Subsequently, in a step of attaching a plate, the wire connection portions 20a extending from the coils 20 are each passed through the corresponding guide cutouts 39 and the partition plate 9 is attached to the stator core 15.

Next, in a connecting step, the wire connection portions 20a extending from the guide cutouts 39 are wound around the feed pins 12 and the common pin 13 and welded, as illustrated in FIG. 5A.

Figure 6A:
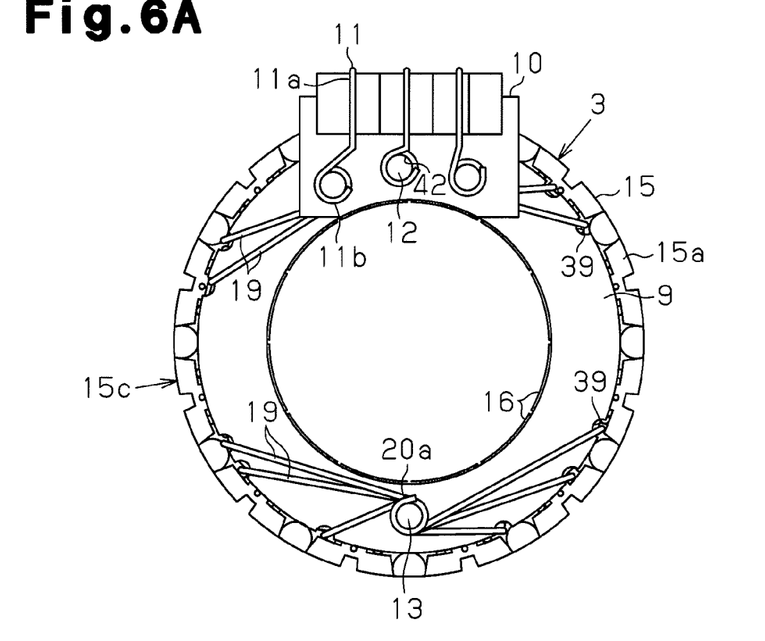
FIG. 6A is a plan view showing the stator illustrated in FIG. 5A having the terminal holder illustrated in FIG. 4A.
Figure 6B:
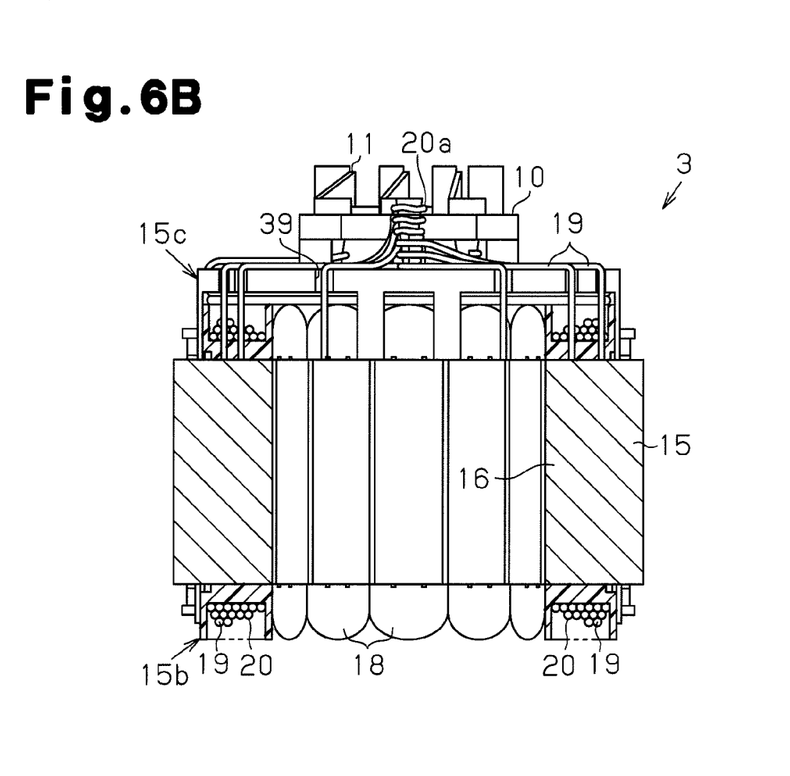
FIG. 6B is a cross-sectional side view showing a portion of FIG. 6A.

In a step of attaching a terminal, with reference to FIG. 6, the terminal holder 10 is attached to the partition plate 9. Then, the feed pins 12 are press-fitted into the spaces defined by the bent terminal portions 11b. The terminals 11 are thus electrically connected to the feed pins 12. As a result, the stator 3 is complete. The stator 3 is then received in and fixed to the housing 2, so that the brushless motor 1 is provided.

The present embodiment has the following advantages.

(1) The stator 3 has the partition plate 9 from which the feed pins 12 and the common pin 13 project. The wire connection portions 20a drawn out from the corresponding coils 20 are wound around the feed pins 12 and the common pin 13. Compared to, for example, the conventional case in which the wires are clamped by the U-shaped bent portions formed of conductive material, the wire connection portions 20a are easily fixed to the stator core 15 in the present embodiment. The feed pins 12 and the common pin 13 all have conductivity and form a drive electric current path connected to the drive power source 14. Accordingly, in the present embodiment, the wire connection portions 20a are electrically connected to the drive power current path of the stator core 15 easily.

The common pin 13 is conductive. Accordingly, by winding the U-phase wires 19u, the V-phase wires 19v, and the W-phase wires 19w around the common pin 13, the common pin 13 is defined as the neutral point of star connection.

The feed pins 12, which are conductive, are electrically connected to the terminals 11 by passing the feed pins 12 through the spaces defined by the corresponding bent terminal portions 11b. The wires 19 are thus electrically connected to the terminals 11. As a result, compare to, for example, the case in which the wires 19 are directly received in the bent terminal portions 11b, the wires 19 are electrically connected to the terminals 11 easily in the present embodiment.

(2) The feed pins 12 and the common pin 13 extend from the partition plate 9 in the directions opposite to the stator core 15. The multiple guide cutouts 39, which face radially outward and extend through the partition plate 9, are formed in the outer circumferential surface of the partition plate 9. The wire connection portions 20a are drawn from the stator core 15 to the terminals 11 by passing through the corresponding guide cutouts 39. The guide cutouts 39 restrict undesirable movement of the wire connection portions 20a. As a result, the wire connection portions 20a are easily wound around the corresponding feed pins 12 and the common pin 13.

The wire connection portions 20a are pressed against the inner circumferential surface of the outer stator ring 15a through the guide cutouts 39. The wires 19 thus extend between the feed pins 12 and the guide cutouts 39, and between the common pin 13 and the guide cutouts 39 in linear manners under tension. This prevents the wires 19 from sagging or loosening.

(3) Two or more of the wire connection portions 20a are wound about each of the feed pins 12 and the common pin 13. This reduces the number of the feed pins 12 and the common pin 13 compared to, for example, a case in which a single one of the wire connection portions 20a is wound around each feed pin 12 and the common pin 13. The configuration of the partition plate 9 is thus simplified.

(4) Each wire connection portion 20a is wound around the corresponding feed pin 12 or the common pin 13 substantially by one turn. This prevents the wire connection portion 20a from separating from the feed pin 12 or the common pin 13 due to restoration force of the wire connection portion 20a. In other words, the wire connection portion 20a is prevented from moving toward a connection start point of the feed pin 12 or the common pin 13. As a result, insufficient electric connection of the coils 20 is prevented.

By increasing the winding angle of each wire connection portion 20a with respect to the corresponding feed pin 12 or the common pin 13, the wire connection portion 20a is prevented from separating from the feed pin 12 or the common pin 13. Accordingly, in the present embodiment, the wire connection portions 20a are fixed easily compared to, for example, a case in which the U-shaped bent portions formed by conductive components, by which the wires are clamped, are swaged. As a result, connection is easily carried out automatically, for example, using a workin robot.

(5) Each feed pin 12 has the tapered portion 12b the diameter of which becomes smaller toward the partition plate 9. The common pin 13 also has the tapered portion 13b. Each wire connection portion 20a is wound around the corresponding tapered portion 12b, 13b. This prevents the wire connection portion 20a from sliding away from the partition plate 9 and separating from the feed pin 12 or the common pin 13 when the wire connection portion 20a is wound around the feed pin 12 or the common pin 13. Accordingly, insufficient electric connection of the coils 20 is suppressed.

(6) Each feed pin 12 has the base portion 12a and the common pin 13 also has the base portion 13a. The partition plate 9 has the first through holes 35 receiving the base portions 12a and the second through hole 37 receiving the base portion 13a. The base portions 12a are supported while partially inserted into the first through holes 35. The base portion 13a is also supported while partially inserted into the second through hole 37. This arrangement efficiently releases the heat produced by welding and fixing the wire connection portions 20a, which are wound around the feed pins 12, to the feed pins 12, through the through holes 35. Similarly, the heat caused by welding the wire connection portions 20a to the common pin 13 is radiated from the second through hole 37. This prevents the feed pins 12 and the common pin 13 from being deformed by the heat of welding. In other words, defects in products are reduced.

(7) The U-phase wires 19u, the V-phase wires 19v, and the W-phase wires 19w are connected to form star-connection, and the neutral point of the star connection is defined by the common pin 13. That is, the neutral point is configured not by a belt-like conductive member but by the common pin 13. This reduces the number of belt-like conductive members. Further, all of the U-phase wires 19u, the V-phase wires 19v, and the W-phase wires 19w are wound around the common pin 13, thus decreasing the number of welding steps. This reduces the number of components and simplifies operating steps, and the stator 3 and the brushless motor 1 are easily manufactured.

(8) The wire distal end projects from each feed pin 12 in a direction offset from the direction of the line connecting the feed pin 12 to an adjacent one of the feed pins 12. Accordingly, even if the winding of the wire connection portion 20a around the feed pin 12 is loosened, the wire connection portion 20a does not easily contact the wire connection portion 20a wound around the adjacent one of the feed pins 12. In other words, a short circuit is prevented.

Each wire connection portion 20a wound around the corresponding feed pin 12 may become loose due to elastic restoration force of the wire connection portion 20a while being wound. The associated wire distal end is spaced from the feed pin 12. Accordingly, if the wire distal end extends along the line connecting the feed pin 12 with the adjacent one of the feed pins 12, the wire distal end may contact the wire connection portion 20a of the adjacent feed pin 12 when the wire connection portion 20a is loosened. However, the present embodiment eliminates such disadvantage.

(9) The uniform diameter portion 12c of each feed pin 12 is passed through the corresponding bent terminal portion 11b. Accordingly, the feed pins 12 are electrically connected to the drive power source 14 easily. Further, since each terminal body 11a does not need to be shaped in any particular manner, the terminals 11 may be shaped in a simple manner and reduced in size.

(10) Each terminal 11 has the belt-like terminal body 11a and the bent terminal portion 11b, which is formed by bending the corresponding end of the terminal body 11a. The bent terminal portion 11b is arranged at the position corresponding to the associated insertion hole 42 of the terminal holder 10. Accordingly, by inserting the feed pins 12 into the insertion holes 42, the feed pins 12 are press-fitted into the spaces defined by the corresponding bent terminal portions 11b. As a result, in the present embodiment, the feed pins 12 are easily fixed to the terminals 11 compared to, for example, a case in which the feed pins 12 are welded to the terminals 11.

The present embodiment may be modified in the following manners.

Figure 7A:
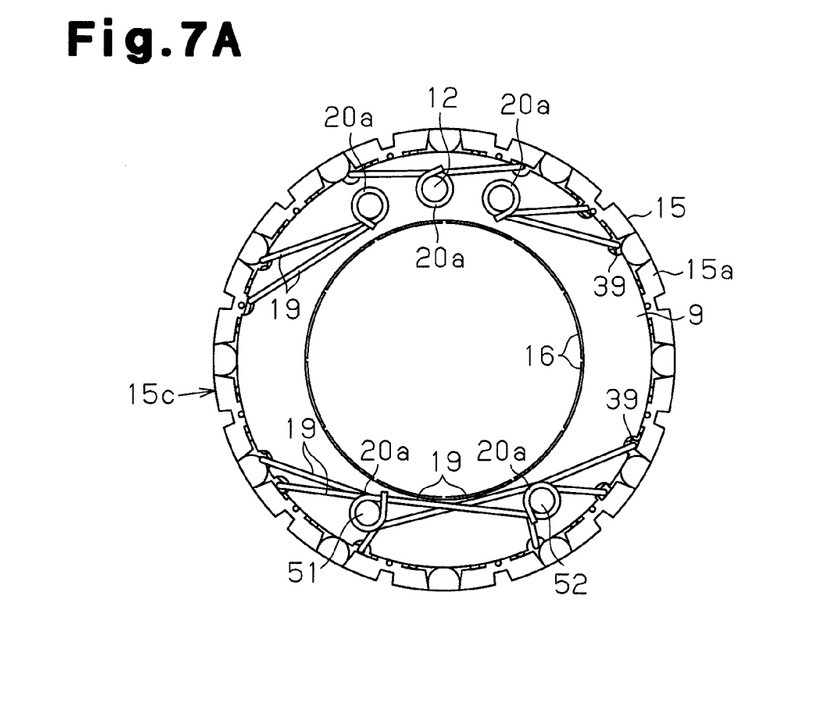
FIG. 7A is a plan view showing the stator illustrated in FIG. 2A having a partition plate of a modification.
Figure 7B:
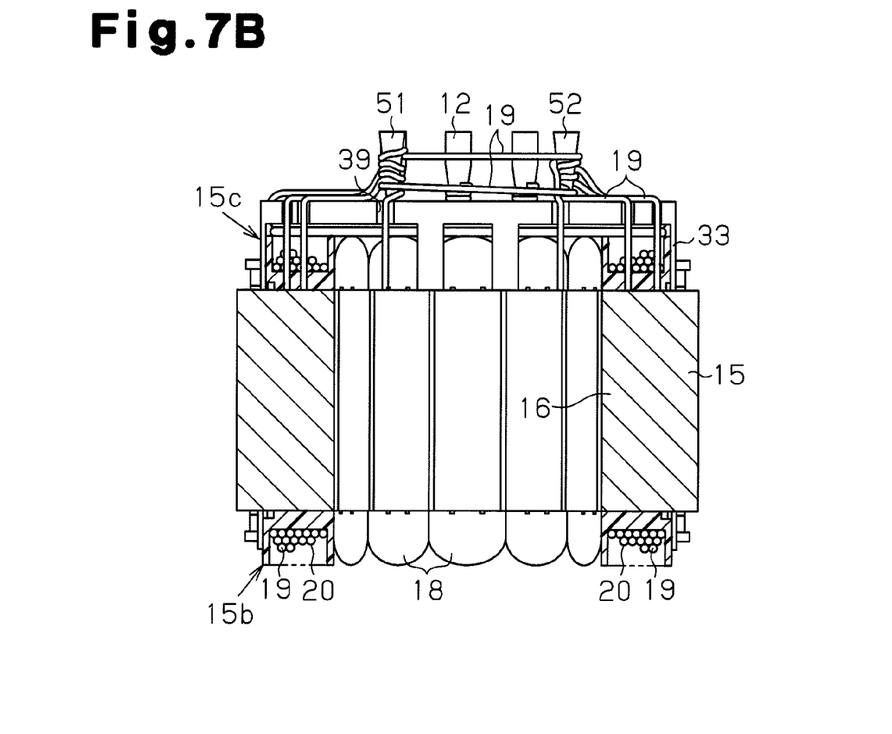
FIG. 7B is a cross-sectional side view showing a portion of FIG. 7A.

The common pin 13 does not necessarily have to be a single common pin, but two or more common pins 13 may be employed. As illustrated in FIGS. 7A and 7B, a first separate common pin 51 and a second separate common pin 52 may be arranged on the partition plate 9 while being spaced from each other. Specifically, three of the wire connection portions 20a are electrically connected to the first separate common pin 51 and the other three of the wire connection portions 20a are electrically connected to the second separate common pin 52. At least one of the wire connection portions 20a that are electrically connected to the first separate common pin 51 is electrically connected to the second separate common pin 52. As a result, the first separate common pin 51 and the second separate common pin 52 each define a neutral point of star connection.

The length of the first separate common pin 51 and the length of the second separate common pin 52 can be decreased compared to the length of the common pin 13. This is because a smaller number of wire connection portions 20a are wound around each of the first separate common pin 51 and the second separate common pin 52, which are illustrated in FIGS. 7A and 7B, than the number of the wire connection portions 20a wound around the common pin 13 illustrated in FIGS. 5A and 5B. Accordingly, the size of the stator 3 and the size of the brushless motor 1 in the axial direction are reduced.

The feed pins 12 and the common pin 13 are not restricted to substantially columnar shapes or conical shapes. As long as the wire connection portions 20a can be wound around the feed pins 12 and the common pin 13, the feed pins 12 and the common pin 13 may have prism-like shapes.

The structure by which each feed pin 12 is attached to the partition plate 9 is not restricted to engagement between the base portion 12a of the feed pin 12 and the corresponding first through hole 35 of the partition plate 9. In other words, the base portion 12a may be omitted from each feed pin 12. Further, the structure by which the common pin 13 is attached to the partition plate 9 is not restricted to engagement between the base portion 13a and the second through hole 37.

One of the tapered portion 12b and the uniform diameter portion 12c may be omitted from each feed pin 12. In other words, the feed pin 12 may be constructed only by either the base portion 12a and the tapered portion 12b or the base portion 12a and the uniform diameter portion 12c.

The common pin 13 does not necessarily have to be formed only by the base portion 13a and the tapered portion 13b but may include a uniform diameter portion. Alternatively, the common pin 13 may be configured by the base portion 13a and the uniform diameter portion.

To allow the wire connection portions 20a to extend through the partition plate 9, through holes may be formed in the partition plate 9 instead of providing the guide cutouts 39 in the outer circumferential surface of the partition plate 9. Alternatively, as long as there is a clearance between the outer stator ring 15a and the partition plate 9 to allow insertion of the wire connection portions 20a through the clearance, it is unnecessary to form the guide cutouts 39 in the partition plate 9.

The winding angle of each wine connection portion 20a with respect to the corresponding feed pin 12 or the common pin 13 is not restricted to 360°, which corresponds to substantial one turn of winding, but may be any suitable angle as long as the winding angle is greater than or equal to 180°. In other words, as long as each wire distal end faces in a direction rotated by a degree at least greater 180° from the winding start point of the wine connection portion 20a with respect to the feed pin 12 or the common pin 13, the wine connection portion 20a may be wound by any suitable number of turns. In this manner, each wire connection portion 20a is prevented from loosening toward the winding start point, and insufficient electric connection of the coil 20 is prevented.

The projecting direction of the wire distal end from each feed pin 12 may be the same as the direction defined by the line connecting the feed pin 12 to an adjacent one of the feed pins 12, instead of being offset from this direction.

The number of the feed pins 12 is not restricted to three but may be greater. For example, instead of electrically connecting the corresponding multiple wires 19 to each feed pin 12, only one wire 19 may be electrically connected to the feed pin 12. Alternatively, the number of the feed pins 12 may be equal to the number of the coils 20.

The U-phase coils 21, the V-phase coils 22, and the W-phase coils 23 may be connected to form delta connection instead of being star connection. In this case, the common pin 13 may be omitted and only the feed pins 12 are employed as the connector pins.

The brushless motor 1 is not restricted to the inner rotor type but may be an outer rotor type.

The invention claimed is:

1. A stator comprising:
a stator core having a plurality of teeth extending radially, the stator core defining an axial direction and a radial direction;
a plurality of coils, each of the coils being formed by winding a corresponding one of a plurality of wires around the corresponding one of the teeth; and
a partition plate from which a plurality of connector pins project, each of the wires having a wire connection portion drawn out from the corresponding one of the coils, wherein the wire connection portion of each wire is wound about the corresponding connector pins, such that the wire is electrically connected to the connector pins,
wherein each of the connector pins has a base portion engaged with the partition plate, and
wherein the partition plate has a plurality of through holes each engaged with one of the base portions, the through holes extending through the partition plate, each base portion being engaged with the partition plate while partially inserted into the corresponding through hole.

2. The stator according to claim 1, wherein the stator core and the partition plate are arranged adjacent to each other in the axial direction, the partition plate lying perpendicular to the axial direction,
wherein the connector pins extend from the partition plate in a direction opposite to the stator core,
wherein the partition plate has a plurality of guide cutouts each facing radially outward, the guide cutouts extending through the partition plate in a direction of a width of the partition plate, and
wherein each wire connection portions extend from the corresponding coils, passes through the corresponding guide cutout, and reaches the corresponding connector pin.

3. The stator according to claim 1, wherein two or more of the wire connection portions are wound around each one of the connector pins.

4. The stator according to claim 1, wherein each wire connection portion is wound around the corresponding connector pin by a winding angle greater than 180 degrees.

5. The stator according to claim 1, wherein each of the connector pins has a tapered portion having a diameter becoming smaller toward the partition plate, and
wherein the wire connection portions are wound around the tapered portions.

6. A stator comprising:
a stator core having a plurality of teeth extending radially, the stator core defining an axial direction and a radial direction;
a plurality of coils, each of the coils being formed by winding a corresponding one of a plurality of wires around the corresponding one of the teeth; and
a partition plate from which a plurality of connector pins project, each of the wires having a wire connection portion drawn out from the corresponding one of the coils, wherein the wire connection portion of each wire is wound about the corresponding connector pins, such that the wire is electrically connected to the connector pins,
wherein the coils are connected to form star connection,
wherein the connector pins include a common pin and a plurality of feed pins,
wherein the common pin is a neutral point of the star connection, and
wherein a drive electric current from a drive power source is supplied to the coils through the corresponding feed pins,
wherein the wires each have a wire distal end projecting from the corresponding wire connection portion with the wire connection portion wound around the corresponding connector pin, each wire distal end extending in a direction different from a direction of a line connecting a corresponding adjacent pair of the feed pins.

7. The stator according to claim 6, wherein a terminal is attached to each of the feed pins, the drive power source supplying the drive electric current to the terminals.

8. A stator comprising:
a stator core having a plurality of teeth extending radially, the stator core defining an axial direction and a radial direction;
a plurality of coils, each of the coils being formed by winding a corresponding one of a plurality of wires around the corresponding one of the teeth; and
a partition plate from which a plurality of connector pins project, each of the wires having a wire connection portion drawn out from the corresponding one of the coils, wherein the wire connection portion of each wire is wound about the corresponding connector pins, such that the wire is electrically connected to the connector pins,
wherein the coils are connected to form star connection,
wherein the connector pins include a common pin and a plurality of feed pins,
wherein the common pin is a neutral point of the star connection, and
wherein a drive electric current from a drive power source is supplied to the coils through the corresponding feed pins,
wherein a terminal is attached to each of the feed pins, the drive power source supplying the drive electric current to the terminals,
wherein each terminal has a belt-like terminal body and a bent terminal portion provided by bending an end of the terminal body, and
wherein each feed pin is press-fitted into the corresponding bent terminal portion.

9. A stator comprising:
a stator core having a plurality of teeth extending radially, the stator core defining an axial direction and a radial direction;
a plurality of coils, each of the coils being formed by winding a corresponding one of a plurality of wires around the corresponding one of the teeth; and
a partition plate from which a plurality of connector pins project, each of the wires having a wire connection portion drawn out from the corresponding one of the coils, wherein the wire connection portion of each wire is wound about the corresponding connector pins, such that the wire is electrically connected to the connector pins,
wherein the coils are connected to form star connection,
wherein the connector pins include a common pin and a plurality of feed pins,
wherein the common pin is a neutral point of the star connection, and
wherein a drive electric current from a drive power source is supplied to the coils through the corresponding feed pins,
wherein the common pin is one of a plurality of separate common pins attached to the partition plate while being spaced from each other, and
wherein the separate common pins are electrically connected to each other through one of the wires that is wound around the separate common pins.

10. A motor including a stator, the stator comprising:
a stator core having a plurality of teeth extending radially, the stator core defining an axial direction and a radial direction;
a plurality of coils, each of the coils being formed by winding a corresponding one of a plurality of wires around the corresponding one of the teeth; and
a partition plate from which a plurality of connector pins project, each of the wires having a wire connection portion drawn out from the corresponding one of the coils, wherein the wire connection portion of each wire is wound about the corresponding connector pins, such that the wire is electrically connected to the connector pins,
wherein the stator core and the partition plate are arranged adjacent to each other in the axial direction, the partition plate lying perpendicular to the axial direction,
wherein the connector pins each extend from the partition plate in the direction opposite to the stator core,
wherein the partition plate has a plurality of guide cutouts each facing radially outward, the guide cutouts extending through the partition plate in a direction of a width of the partition plate, and
wherein each wire connection portions each extends from the corresponding coil, passes through the corresponding guide cutout, and reaches the corresponding connection pin,
wherein the coils are connected to form star connection,
wherein the connector pins include a common pin and a plurality of feed pins,
wherein the common pin is a neutral point of the star connection, wherein a drive electric current from a drive power source is supplied to the coils through the corresponding feed pins, wherein the common pin is one of a plurality of separate common pins attached to the partition plate while being spaced from each other, and wherein the separate common pins are electrically connected to each other through one of the wires that is wound around the separate common pins.

11. The motor according to claim 10, wherein each terminal has a belt-like terminal body and a bent terminal portion provided by bending an end of the terminal body, and wherein each feed pin is press-fitted into the corresponding bent terminal portion.

* * * * *